United States Patent
Klein et al.

(10) Patent No.: US 10,467,164 B2
(45) Date of Patent: *Nov. 5, 2019

(54) INPUT/OUTPUT PORT ROTATION IN A STORAGE AREA NETWORK DEVICE

(71) Applicant: International Business Machines Corporation, Armonk, NY (US)

(72) Inventors: Steven E. Klein, Tucson, AZ (US); Timothy J. Van Patten, Broomfield, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,465

(22) Filed: Nov. 22, 2017

(65) Prior Publication Data

US 2018/0095917 A1 Apr. 5, 2018

Related U.S. Application Data

(63) Continuation of application No. 15/146,866, filed on May 4, 2016, now Pat. No. 9,858,223, which is a (Continued)

(51) Int. Cl.
*G06F 3/00* (2006.01)
*G06F 13/366* (2006.01)
(Continued)

(52) U.S. Cl.
CPC .............. *G06F 13/366* (2013.01); *G06F 3/06* (2013.01); *G06F 3/061* (2013.01); *G06F 3/067* (2013.01);
(Continued)

(58) Field of Classification Search
CPC ........ G06F 3/06; G06F 3/0613; G06F 3/0635; G06F 3/067; G06F 13/385; G06F 13/366; G06F 3/0655; G06F 3/061
See application file for complete search history.

(56) References Cited

U.S. PATENT DOCUMENTS 3,996,564 A * 12/1976 Kerrigan ................. G06F 13/34
710/48
5,528,406 A * 6/1996 Jeffrey ................ H04L 12/5601
398/55
(Continued)

FOREIGN PATENT DOCUMENTS

| CN | 1542607 A | 11/2004 |
|---|---|---|
| CN | 101739221 A | 6/2010 |

(Continued)

OTHER PUBLICATIONS

PCT International Search Report & Written Opinion dated Jul. 18, 2013 for Application No. PCT/IB2013/051375.
(Continued)

*Primary Examiner* — Jing-Yih Shyu
(74) *Attorney, Agent, or Firm* — William K. Konrad; Konrad Rayne Davda & Victor LLP

(57) ABSTRACT

In one aspect of the present description, in an input/output (I/O) device having multiple CPUs and multiple I/O ports, a cycle of I/O port rotations is initiated in which each port rotation of the cycle includes rotating an assignment of at least one I/O port from one CPU to a different CPU of a plurality of the CPUs. In the illustrated embodiment, an I/O port assignment for each CPU of the plurality CPUs is rotated for at least a portion of the cycle. Other features and aspects may be realized, depending upon the particular application.

30 Claims, 7 Drawing Sheets

Related U.S. Application Data continuation of application No. 14/452,229, filed on Aug. 5, 2014, now Pat. No. 9,377,952, which is a continuation of application No. 13/470,137, filed on May 11, 2012, now Pat. No. 8,904,053, which is a continuation of application No. 13/418,234, filed on Mar. 12, 2012, now Pat. No. 8,825,915.

(51) Int. Cl.
*G06F 3/06* (2006.01)
*G06F 13/38* (2006.01)

(52) U.S. Cl.
CPC .......... *G06F 3/0613* (2013.01); *G06F 3/0635* (2013.01); *G06F 3/0655* (2013.01); *G06F 13/385* (2013.01)

(56) References Cited

U.S. PATENT DOCUMENTS

| | | | |
|---|---|---|---|
| 6,675,251 | B1 | 1/2004 | Streitenberger et al. |
| 6,904,056 | B2 | 6/2005 | Merani et al. |
| 7,082,104 | B2 | 7/2006 | Wolrich et al. |
| 7,206,901 | B2 | 4/2007 | Kanai |
| 7,272,674 | B1 | 9/2007 | Nandi et al. |
| 7,274,690 | B1 | 9/2007 | Park et al. |
| 7,362,769 | B2 | 4/2008 | Black et al. |
| 7,606,986 | B1 | 10/2009 | Limaye et al. |
| 7,961,649 | B2 * | 6/2011 | Beshai ............... H04L 49/10 370/254 |
| 8,130,753 | B2 | 3/2012 | Beshai |
| 8,321,596 | B2 | 11/2012 | Johnson et al. |
| 8,370,570 | B2 | 2/2013 | Motonaga et al. |
| 8,825,915 | B2 | 9/2014 | Klein et al. |
| 8,904,053 | B2 | 12/2014 | Klein et al. |
| 9,377,952 | B2 | 6/2016 | Klein et al. |
| 2003/0236961 | A1 | 12/2003 | Qiu et al. |
| 2008/0104264 | A1 | 5/2008 | Duerk et al. |
| 2008/0127199 | A1 * | 5/2008 | Miki ................. G06F 3/0613 718/105 |
| 2009/0063733 | A1 | 3/2009 | Huang et al. |
| 2010/0318736 | A1 | 12/2010 | Balsubramanian |
| 2011/0252166 | A1 | 10/2011 | Padala et al. |
| 2013/0238817 | A1 | 9/2013 | Klein et al. |
| 2013/0238818 | A1 | 9/2013 | Klein et al. |
| 2014/0351461 | A1 | 11/2014 | Klein et al. |
| 2016/0246744 | A1 | 8/2016 | Klein et al. |

FOREIGN PATENT DOCUMENTS

| | | |
|---|---|---|
| CN | 102291257 A | 12/2011 |
| WO | WO2010085256 A1 | 7/2010 |

OTHER PUBLICATIONS

English Translation of CN1542607 published Nov. 3, 2004.
English Translation of CN102291257 published Dec. 21, 2011.
R.E Bodner, "Multiple Class Cycle Steal System", IP.com, IP.com No. IPCOM000083021D, Feb. 28, 2005, pp. 11.
Chinese Office Action dated Sep. 12, 2016, pp. 5, for Application 201380013728.1, filed Feb. 20, 2013.
English translation of CN102291257 published Jun. 16, 2010.
Information Materials for IDS, dated Sep. 21, 2012, pp. 3, to Chinese Office Action dated Sep. 12, 2016, pp. 5, for Application 201380013728.1, filed Feb. 20, 2013.
Search Report dated Sep. 12, 2016, pp. 2, to Chinese Office Action dated Sep. 12, 2016, pp. 5, for Application 201380013728.1, filed Feb. 20, 2013.
English translation of Chinese Office Action dated Sep. 12, 2016, pp. 5, for Application 201380013728.1, filed Feb. 20, 2013.
U.S. Appl. No. 13/418,234, filed Mar. 12, 2012.
Preliminary Amendment filed May 11, 2012, pp. 7, for U.S. Appl. No. 13/418,234, filed Mar. 12, 2012.
Office Action received filed Sep. 3, 2013, pp. 24, for U.S. Appl. No. 13/418,234, filed Mar. 12, 2012.
Response dated Dec. 3, 2013, pp. 17, to Office Action received filed Sep. 3, 2013, pp. 24, for U.S. Appl. No. 13/418,234, filed Mar. 12, 2012.
Office Action dated Feb. 13, 2014, pp. 16, for U.S. Appl. No. 13/418,234, filed Mar. 12, 2012.
Response dated Apr. 14, 2014, pp. 8, to Office Action received filed Feb. 13, 2014, pp. 16, for U.S. Appl. No. 13/418,234, filed Mar. 12, 2012.
Notice of Allowance dated Apr. 29, 2014, pp. 9, for U.S. Appl. No. 13/418,234, filed Mar. 12, 2012.
U.S. Appl. No. 13/470,137, filed May 11, 2012.
Office Action dated Mar. 24, 2014, pp. 34, for U.S. Appl. No. 13/470,137, filed May 11, 2012.
Response dated Jun. 24, 2014, pp. 13, to Office Action dated Mar. 24, 2014, pp. 34, for U.S. Appl. No. 13/470,137, filed May 11, 2012.
Notice of Allowance dated Jul. 28, 2014, pp. 13, for U.S. Appl. No. 13/470,137, filed May 11, 2012.
U.S. Appl. No. 14/452,229, filed Aug. 5, 2014.
Office Action dated May 11, 2015, pp. 36, for U.S. Appl. No. 14/452,229, filed Aug. 5, 2014.
Response dated Aug. 11, 2015, pp. 20, to Office Action dated May 11, 2015, pp. 36, for U.S. Appl. No. 14/452,229, filed Aug. 5, 2014.
Final Office Action dated Oct. 15, 2015, pp. 21, for U.S. Appl. No. 14/452,229, filed Aug. 5, 2014.
Response dated Jan. 8, 2016, pp. 11, to Office Action dated May 11, 2015, pp. 36, for U.S. Appl. No. 14/452,229, filed Aug. 5, 2014.
AFCP Response dated Feb. 4, 2016, pp. 11, to Final Office Action dated Oct. 15, 2015, pp. 21, for U.S. Appl. No. 14/452,229, filed Aug. 5, 2014.
Notice of Allowance dated Mar. 2, 2016, pp. 9, for U.S. Appl. No. 14/452,229, filed Aug. 5, 2014.
U.S. Appl. No. 15/146,866, filed Nov. 2, 2016.
Office Action dated Nov. 2, 2016, pp. 26, for U.S. Appl. No. 15/146,866, filed Nov. 2, 2016.
Response dated Mar. 2, 2017, pp. 20, to Office Action dated Nov. 2, 2016, pp. 26, for U.S. Appl. No. 15/146,866, filed Nov. 2, 2016.
Notice of Allowance dated Aug. 5, 2017, pp. 13, for U.S. Appl. No. 15/146,866, filed Nov. 2, 2016.
List of IBM Patents or Patent Applications Treated as Related, dated Nov. 2017, pp. 2.

* cited by examiner

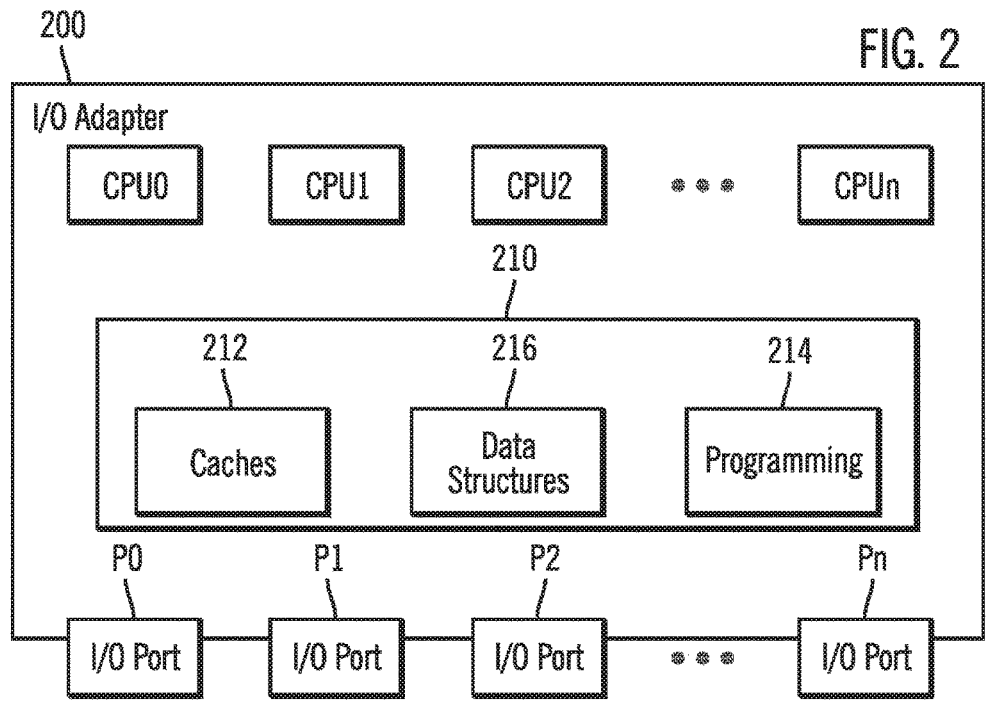
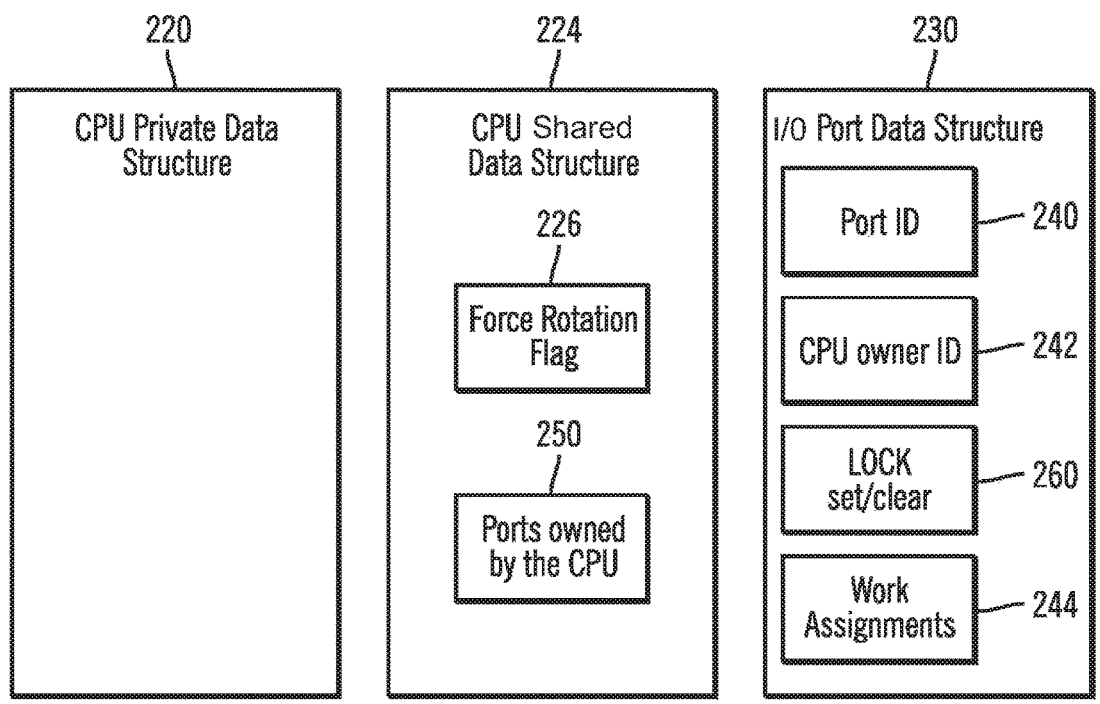

FIG. 5

PORT ROTATION PR0

| | CPU0 | CPU1 | CPU2 | CPU3 |
|---|---|---|---|---|
| ACTIVE PORTS OWNED | P0 | P1 | P2, P3 | P4 |

PORT ROTATION PR1

| | CPU0 | CPU1 | CPU2 | CPU3 |
|---|---|---|---|---|
| ACTIVE PORTS OWNED | P0 | P1 | P3 | P4, P2 |

PORT ROTATION PR2

| | CPU0 | CPU1 | CPU2 | CPU3 |
|---|---|---|---|---|
| ACTIVE PORTS OWNED | P0, P4 | P1 | P3 | P2 |

PORT ROTATION PR3

| | CPU0 | CPU1 | CPU2 | CPU3 |
|---|---|---|---|---|
| ACTIVE PORTS OWNED | P4 | P1, P0 | P3 | P2 |

PORT ROTATION PR4

| | CPU0 | CPU1 | CPU2 | CPU3 |
|---|---|---|---|---|
| ACTIVE PORTS OWNED | P4 | P0 | P3, P1 | P2 |

PORT ROTATION PR5

| | CPU0 | CPU1 | CPU2 | CPU3 |
|---|---|---|---|---|
| ACTIVE PORTS OWNED | P4 | P0 | P1 | P2, P3 | time

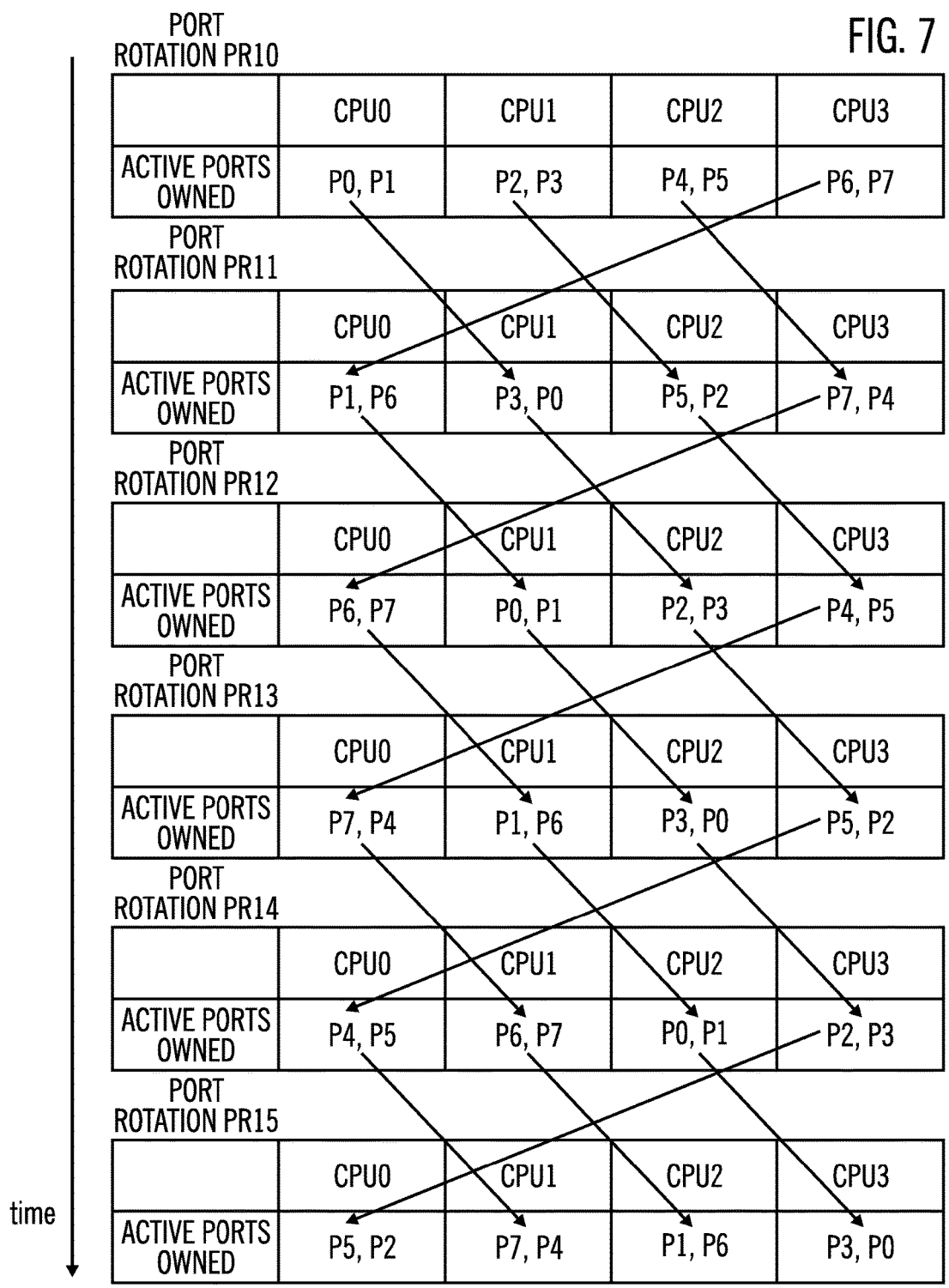

INPUT/OUTPUT PORT ROTATION IN A STORAGE AREA NETWORK DEVICE

BACKGROUND

1. Field

The present description relates to a method, system, and computer program for assigning input/output ports in a storage area network.

2. Description of Related Art

A storage area network (SAN) is frequently used to couple remote computer storage devices such as disk arrays, tape libraries, optical jukeboxes or other storage devices, to hosts in a manner which permits the storage devices to appear to the operating systems of the hosts as locally attached to the hosts. Fibre Channel (FC) is a high speed networking technology in which signals may be transmitted over various transmission media including fiber optic cable or twisted pair copper cables, for example.

A storage controller may have multiple servers which are assigned input/output (I/O) tasks by the hosts. The I/O tasks may be directed to specific volumes in the storage. The storage controller may further have multiple input/output (I/O) adapters such as host adapters which enable the servers to communicate with the hosts, and device adapters which enable the servers of the storage controller to communicate with the storage devices. An I/O adapter may have multiple CPUs which receive input/output requests from one or more servers of the storage controller to perform input/output operations in which data is read from or written to storage through various I/O ports of the I/O adapter. I/O adapters frequently have a shared resource environment in which resources, such as hardware resources such as I/O ports, and memory resources such as data structures in memory, for example, may be shared by multiple CPUs. An example of a shared resource environment used in I/O adapters is the Symmetric Multiprocessing (SMP) environment, for example.

Access to the shared resources may be controlled using appropriate rules such as single ownership or shared ownership rules, for example. In one typical shared resource environment, access to a shared resource may be accomplished by using lock words in shared memory data structures that control access to the resource being accessed. Another method known in the art is to group associated data structures for various resources together in a task control block that is allocated each time a task begins and is locked and unlocked by each CPU as operations of the task are carried out.

In a typical shared resource environment, each of the I/O ports will have its work performed almost entirely under the control of a single CPU until the tasks of that I/O port are completed. Such an arrangement is believed to improve the performance of a multi-CPU adapter by, for example, reducing cache thrashing.

A list of the I/O port or ports assigned to a particular CPU may be stored in an element of a data structure for that CPU. The particular CPU assigned to a particular I/O port may also be identified by an appropriate CPU owner ID stored in an element of a data structure assigned to the particular I/O port.

The CPU assigned a particular I/O port may prevent other CPUs from accessing that particular I/O port by setting a lock in an element of a data structure assigned to that particular I/O port. Once the I/O port is no longer owned by a particular CPU, the lock element may be cleared.

The I/O tasks to be performed in connection with a particular I/O port may be identified in an element of a data structure assigned to a particular I/O port. The I/O work assignments performed in connection with an I/O port include, for example, communicating with the particular communication protocol hardware, such as Fibre Channel Optics hardware, for example, submitting work to a direct memory access (DMA) engine in logic hardware such as an ASIC, for example, in the I/O adapter to move data in and out of one or more of the caches, etc.

SUMMARY

Processes, hardware, software, firmware and combinations thereof may perform operations including assigning input/output (I/O) ports to a plurality of central processing units (CPUs) of an I/O adapter and, for each CPU, and transferring data between the CPU and each I/O port assigned to that CPU. In one aspect of the present description, the aforementioned operations may be combined with cycles of I/O port rotations wherein each port rotation of a cycle includes rotating an assignment of at least one I/O port from one CPU to a different CPU of the plurality of CPUs. Furthermore, an I/O port assignment for each CPU of the plurality CPUs may be rotated for at least a portion of the cycle.

In another aspect, the data transferring may include initiating a task of transfer of data at the at least one I/O port under control of the one CPU and continuing the task of transfer of data at the at least one I/O port under control of the different CPU following the rotation of assignment of the at least one I/O port from the one CPU to the different CPU. Also, determining whether to initiate a cycle of I/O port rotations, may include determining whether the number of CPUs of the plurality of CPUs is greater than or equal to the number of I/O ports of the I/O adapter.

In another aspect, determining whether to initiate a cycle of I/O port rotations, may include determining whether a predetermined time period has expired. In addition, initiating a cycle of I/O port rotations may include setting by one CPU, a rotation flag for the remaining CPUs of the plurality of CPUs, to initiate port rotations for the remaining CPUs of the plurality of CPUs.

In still another aspect, each port rotation of the cycle of I/O port rotations may include determining for each CPU, whether to rotate a port assignment of the particular CPU to a different CPU of the plurality of CPUs. Furthermore, initiating a cycle of I/O port rotations may include setting by one CPU, a rotation flag for the remaining CPUs of the plurality of CPUs, to initiate port rotations for the remaining CPUs of the plurality of CPUs, and determining for each CPU whether to rotate a port assignment, may include checking whether the rotation flag has been set for that particular CPU.

In a further aspect, determining for each CPU whether to rotate a port assignment, may include determining whether that particular CPU has any active I/O ports. Also, determining for each CPU whether to rotate a port assignment, may include determining whether that CPU has fewer active I/O ports than any other CPU of the plurality of CPUs.

In yet another aspect, determining for each CPU whether to rotate a port assignment, may include selecting an I/O port owned by the particular CPU for rotation of its port assignment to another CPU. Also, selecting an I/O port owned by the particular CPU for rotation of its port assignment to another CPU, may include selecting the active I/O port which has been owned the longest by the particular CPU.

In still another aspect, the CPUs of the plurality of CPUs may be sequentially numbered in a sequence and rotating an assignment of at least one I/O port from one CPU to a different CPU of the plurality of CPUs may include rotating an assignment of at least one I/O port from one CPU to the next sequentially numbered CPU in the sequence of the sequentially numbered CPUs.

Other features and aspects may be realized, depending upon the particular application.

BRIEF DESCRIPTION OF THE DRAWINGS

FIG. 2 illustrates an embodiment of an I/O adapter in which I/O port assignments are rotated in accordance with the present description.

FIGS. 3a-3c depict examples of data structures for the I/O adapter of FIG. 2.

FIG. 5 depicts a chart illustrating one example of I/O port assignment rotations in accordance with one aspect of the present description.

FIG. 7 depicts another chart illustrating another example of I/O port assignment rotations in accordance with one aspect of the present description.

DETAILED DESCRIPTION

Figure 1:
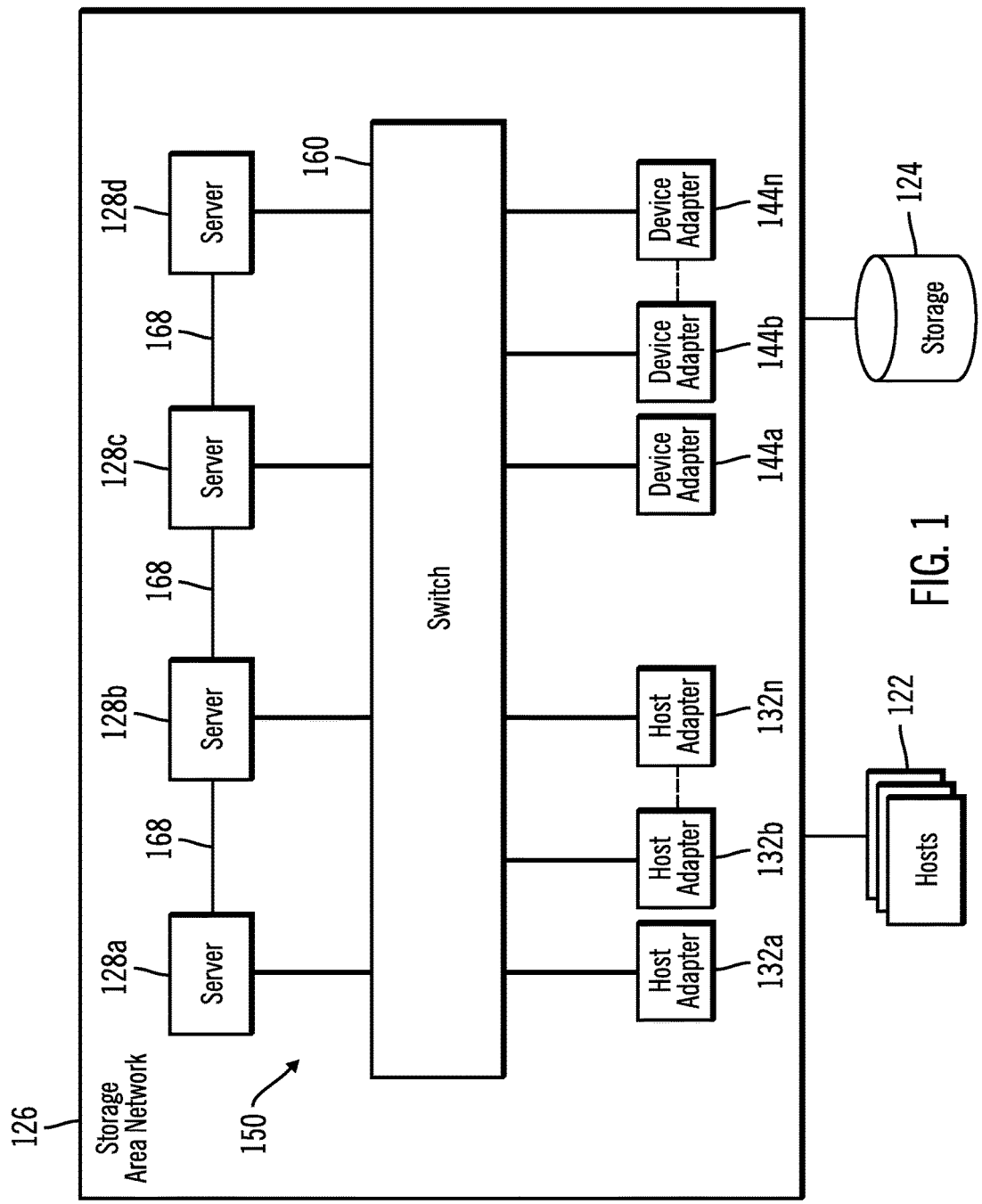
FIG. 1 illustrates an embodiment of a computing environment in which an aspect of the present description may be employed.

FIG. 1 illustrates one example of a computing environment employing an aspect of the present description. In accordance with the present description, in an input/output (I/O) device having multiple CPUs and multiple I/O ports, a cycle of I/O port rotations is initiated. Each port rotation of the cycle includes rotating an assignment of at least one I/O port from one CPU to a different CPU of a plurality of the CPUs. In the illustrated embodiment, an I/O port assignment for each CPU of the plurality CPUs is rotated for at least a portion of the cycle. Such an arrangement is believed to improve workload balancing among the I/O ports, for example. However, other features or aspects may be realized, depending upon the particular application.

In the environment of FIG. 1, one or more hosts 122 communicate Input/Output (I/O) tasks or other processing requests directed to a storage 124, through a storage area network 126 which manages access to the storage 124. In one embodiment, the storage area network 126 includes a plurality of servers 128a, 128b, 128c, 128d, each including a processor and a memory. Each processor can include one or more central processing units (CPUs) available as processing resources to the associated server 128a-128d. Although the storage area network 126 is depicted as including four servers 128a-128d, for purposes of illustration, it is appreciated that the number of servers may be greater or lesser, depending upon the particular application.

Each server 128a-128d may have one or more logical partitions executing in the server 128a-128d. Each logical partition separately executes an operating system and device drivers. The logical partitions comprise a division of the processors into logically independent but cooperating processing systems each having their own operating systems and device drivers. Multiple logical partitions may execute in each server 128a-128d, managed by a supervisor module for that server 128a-128d.

Each device driver provides an interface between the operating system in the logical partition in which the device driver executes, and a device, such as an I/O adapter including host adapters 132a, 132b . . . 132n, and device adapters 144a, 144b . . . 144n. The host adapters 132a, 132b . . . 132n, enable the servers 128a-128d to communicate with the hosts 122. The device adapters 144a, 144b . . . 144n enable the servers 128a-128d to communicate with the storage 124. Thus, the servers 128a-128d share devices, such as adapters 132a, 132b . . . 132n, 144a, 144b . . . 144n. The variable "n" is used to denote an integer instance of an element, and may indicate different or the same integer value when used with different elements. For instance, 132n, 144n, may indicate a same or different number of host adapters 132n, and device adapters 144n.

The servers 128a-128d communicate with the host adapters 132a, 132b . . . 132n, and the device adapters 144a, 144b . . . 144n, over a fabric 150. The fabric 150 may comprise one or more interfaces providing communication paths between the servers 128a-128d and adapters. A path comprises the hardware in the fabric 150 that enables communication with shared adapters over the fabric. The fabric may comprise for example, a Fibre Channel arbitrated loop configuration, a serial loop architecture or a bus interface, such as a Peripheral Component Interconnect (PCI) interface such as a PCI-Express interface. Each server 128a-128d may be assigned a portion of the adapters 132a, 132b . . . 132n, 144a, 144b . . . 144n during initialization.

In the example of FIG. 1, the fabric 150 may include a switch 160 which facilitates sharing of the adapters 132a, 132b . . . 132n, 144a, 144b . . . 144n by each of the servers 128a-128d. The servers 128a-128d may be assigned to handle I/O requests directed to specific volumes configured in the storage 124. The servers 128a-128d communicate over connections 168 enabling processor inter-communication to manage configuring operations performed with respect to the shared devices, such as the shared adapters 132a, 132b . . . 132n, 144a, 144b . . . 144n.

FIG. 2 shows an I/O adapter 200 which may be the same as or similar to the adapters 132a, 132b . . . 132n, 144a, 144b . . . 144n of FIG. 1. In the illustrated embodiment, the I/O adapter 200 may be a Fibre Channel adapter, for example. The I/O adapter 200 may utilize other communication protocols, depending upon the particular application.

The adapter 200 has a plurality of CPUs, that is, CPU0, CPU1, CPU2 . . . CPUn which receive input/output requests from one or more servers 128a-128d, to perform input/output operations in which data is read from or written to storage through various I/O ports P0, P1, P2, . . . Pn. As used herein, the term CPU refers to a processing resource which may be implemented with one or more physical processing cores which may be apportioned into one or more processing resources associated with each processing core. Thus, as used herein, the term CPU may be used to refer to a one or more physical processing units or cores or a portion of such providing a processing resource.

The adapter 200 has additional resources such as I/O port resources provided by the I/O ports P0, P1, P2, . . . Pn. Thus, as used herein, the term I/O port may be used to refer to a physical I/O port or a portion of such providing an I/O port resource to one or more CPUs.

Additional resources of the adapter 200 include memory resources provided by a memory 210. These memory resources include caches 212 which may temporarily store data such as I/O data for the CPUs, CPU0, CPU1, CPU2 . . . CPUn. Each CPU, CPU0, CPU1, CPU2 . . . CPUn, may have access to one or more caches of the adapter 200.

The memory resources further include programming resources 214 which may include operating systems, programs and device drivers, for example, for the CPUs, CPU0, CPU1, CPU2 . . . CPUn. Other memory resources include data structures 216. Each CPU may have access to one or more data structures 216.

FIG. 3a shows an example of private data structure 220 for a particular CPU. Thus, read or write access to the CPU private data structure 220 may be limited to a particular CPU assigned to that particular CPU private data structure 220. Each of the CPUs, CPU0, CPU1, CPU2 . . . CPUn, may similarly have a CPU private data structure 220.

FIG. 3b shows an example of a CPU shared data structure 224. In the illustrated embodiment, and as explained in greater detail below, the CPU shared data structure 224 includes an element 226 in which a "Force Rotation Flag" may be stored by one CPU to initiate I/O port assignment rotation by the CPU assigned the particular CPU shared data structure 224. Thus, read or write access to the CPU shared data structure 224 may be permitted for more than one CPU.

Each I/O port may similarly have one or more data structures associated with a particular I/O port. FIG. 3c shows an example of an I/O port data structure 230 for a particular I/O port. Each I/O port may be controlled by a particular CPU, CPU0, CPU1, CPU2 . . . CPUn. Thus, read or write access to the I/O port data structure 230 may be limited to the particular CPU associated with the particular I/O port.

In the illustrated embodiment, the adapter 200 is a shared resource environment. One example of such as a shared resource environment is the Symmetric Multiprocessing (SMP) environment, for example. Other types of shared resource environments may be suitable, depending upon the particular application.

In a shared resource environment, resources such as hardware resources including I/O ports, and memory resources including data structures in memory, for example, may be shared by multiple CPUs. Accordingly, access to the shared resources may be appropriately controlled using appropriate rules such as single ownership or shared ownership rules, for example. In one typical shared resource environment, access to a shared resource may be accomplished by using lock words in shared memory data structures that control access to a particular resource. Another method known in the art is to group associated data structures together in a task control block that is allocated each time a task begins and is locked and unlocked by each CPU as operations of the task are carried out.

As previously mentioned, the I/O adapter 200 has a plurality of I/O ports P0, P1, P2, . . . Pn which are serviced by one or more CPUs, CPU0, CPU1, CPU2 . . . CPUn. In the illustrated embodiment, the I/O port data structure 230 for the associated I/O port P0, P1, P2, . . . Pn, has elements duplicated for each of the I/O ports and are indexed by port number. Thus, if the I/O port data structure 230 of FIG. 3c is for the I/O port P0, for example, the I/O port data structure 230 has an element 240 which stores the port index number or other identification for the port P0. The particular I/O port associated with each of the other I/O port data structures 230 for the remaining I/O ports P1, P2, . . . Pn is similarly identified in an element 240 with the port index number for the particular port number.

Such a common layout for the I/O port data structures 230 for the I/O port ports P0, P1, P2, . . . Pn can facilitate application of common code and structures on adapters that deploy different numbers of ports (e.g. 1, 2, 4, 8, etc.). It is appreciated that the layout for different I/O port data structures for different I/O ports, may vary, from I/O port to I/O port, depending upon the particular application.

In the illustrated embodiment, each of the I/O ports will have its work performed almost entirely by a single CPU at a time. Such an arrangement is believed to improve the performance of a multi-CPU adapter. The particular CPU assigned to a particular I/O port may be identified by a "CPU owner ID" or other suitable identification stored in an element 242 of the I/O port data structure 230 assigned to the particular I/O port.

A list of the I/O port or ports assigned to a particular CPU may be stored in an element 250 of the CPU shared data structure 224 for that CPU. The CPU assigned a particular I/O port may prevent other CPUs from accessing that particular I/O port by setting a lock in an element 260 of the I/O port data structure 230 assigned to that particular I/O port. Once the I/O port is no longer owned by a particular CPU, the lock element 260 may be cleared.

The I/O tasks to be performed in connection with a particular I/O port may be identified in a "work assignments" element 244 of the I/O port data structure 230 assigned to a particular I/O port. The I/O work assignments performed in connection with an I/O port includes, for example, communicating with the particular communication protocol hardware, such as Fibre Channel Optics hardware, for example, submitting work to a direct memory access (DMA) engine in logic hardware such as an ASIC, for example, in the adapter 200 to move data in and out of one or more of the caches 212, etc. It is believed that assigning a particular I/O port to a particular CPU helps reduce the amount of cache thrashing that can occur when multiple CPUs access a port or its data structures. Other work assignments may be assigned to an I/O port, depending upon the particular application.

In an I/O adapter with multiple CPUs and multiple ports, it's possible that at a particular time, the number of ports actively running I/O tasks may not be evenly distributable among all of the CPUs. For example, an adapter may have two CPUs and four I/O ports. However due to various factors, it is possible that only three of the four I/O ports is actively performing work. Accordingly, if the three active I/O ports are distributed between the two CPUs, one CPU will be assigned two active I/O ports whereas the other CPU will be assigned only one active I/O port. This unbalanced port ownership can lead to less work being performed by each of the ports that are sharing a CPU, and more work being performed for the port that has a single CPU assigned to it. As a result, an even distribution of workload amongst the active I/O ports may be impaired.

In accordance with one aspect of the present description, ownership or assignments of one or more active I/O ports may be rotated among CPUs of the I/O adapter. It is believed that such an arrangement may improve the balance of the workload among the active I/O ports, for example. However, it is appreciated that in other applications, other features may be realized in addition thereto or instead of an improvement in workload balance, depending upon the particular application.

Thus, in one application of the present description, rotation of I/O port assignments may be applied in instances in which the number of active ports is not evenly distributable among all of the CPUs in the adapter. To improve the balance of the work that is performed for all active ports in an I/O adapter, port ownership of some or all of the I/O ports owned by the CPUs may be rotated in one or more cycles of port rotations. Once it is determined that port rotation should occur, each CPU looks for an I/O port among the I/O ports owned by that CPU, which it deems suitable for rotation, and if found, rotates it to another CPU.

For example, a timer may be used to initiate a cycle of port rotations and each port rotation within the cycle. It is appreciated that other criteria may be used to determine when to initiate a port rotation or a cycle of port rotations, depending upon the particular application.

In addition, to determine a suitable port for port rotation, a CPU may, in one embodiment, determine how many active ports it currently owns in relation to the other CPUs in the adapter. If the CPU finds that it currently has fewer ports than any other CPU, in one embodiment, it will not rotate an active port that it owns. However, if a CPU determines that it has at least the same number of ports as all the other CPUs, or more ports than all other CPUs, it will rotate the active port it has owned the longest. It is appreciated that other criteria may be used to determine a suitable I/O port for assignment rotation, depending upon the particular application.

Thus, once the timer has indicated that a cycle of port rotations should occur, over the course of that cycle, each CPU owning an appropriate number of I/O ports, finds the active port it has owned the longest and rotates it to the next n+1 CPU in sequential order. In one embodiment, the cycle of port rotations is complete once an I/O assignment for each CPU of the I/O adapter is rotated for at least a portion of the cycle. The next time the timer expires following completion of a cycle, another cycle of rotations may be repeated.

It is believed that such an arrangement can improve distribution of ownership of I/O ports amongst the CPUs of the adapter and thus improve distribution of workload amongst the CPUs of the adapter. It is appreciated that other features may be realized in addition thereto or instead of workload balancing, depending upon the particular application.

Figure 4:
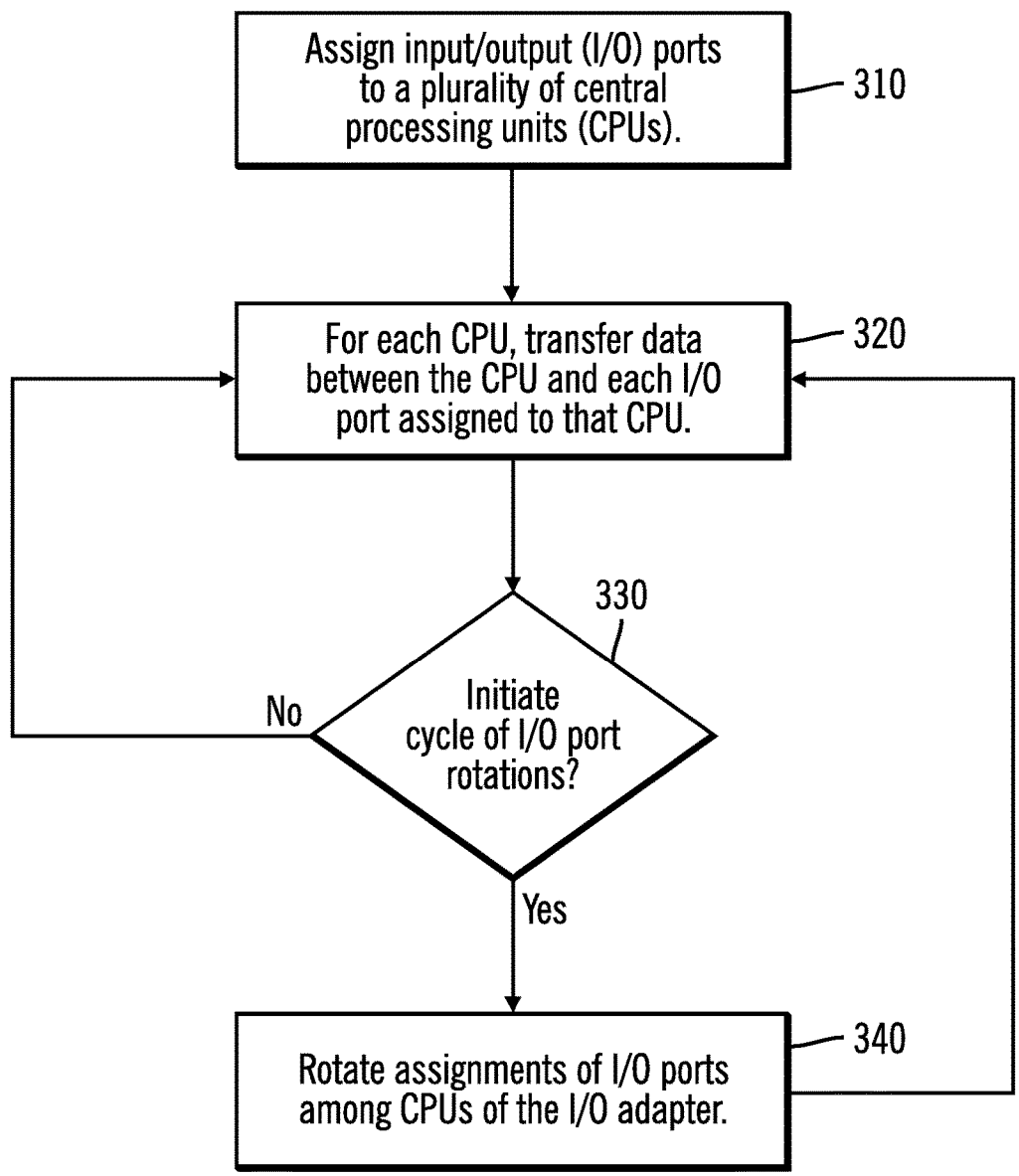
FIGS. 4 and 4a depict examples of operations to perform I/O port assignment rotations in accordance with one aspect of the present description.

FIG. 4 depicts an example of operations of an I/O adapter in which assignments of one or more active I/O ports may be rotated among CPUs of the I/O adapter. In a first operation, I/O ports are assigned (block 310) to a plurality of CPUs. Following each assignment (or reassignment described below), the CPUs conduct I/O operations (block 320, FIG. 4) through their assigned I/O ports. A determination (block 330, FIG. 4) is made as to whether a cycle of I/O port rotations should be initiated. If so, assignments of I/O ports may be rotated (block 340, FIG. 4) among CPUs of the I/O adapter.

Figure 4A:
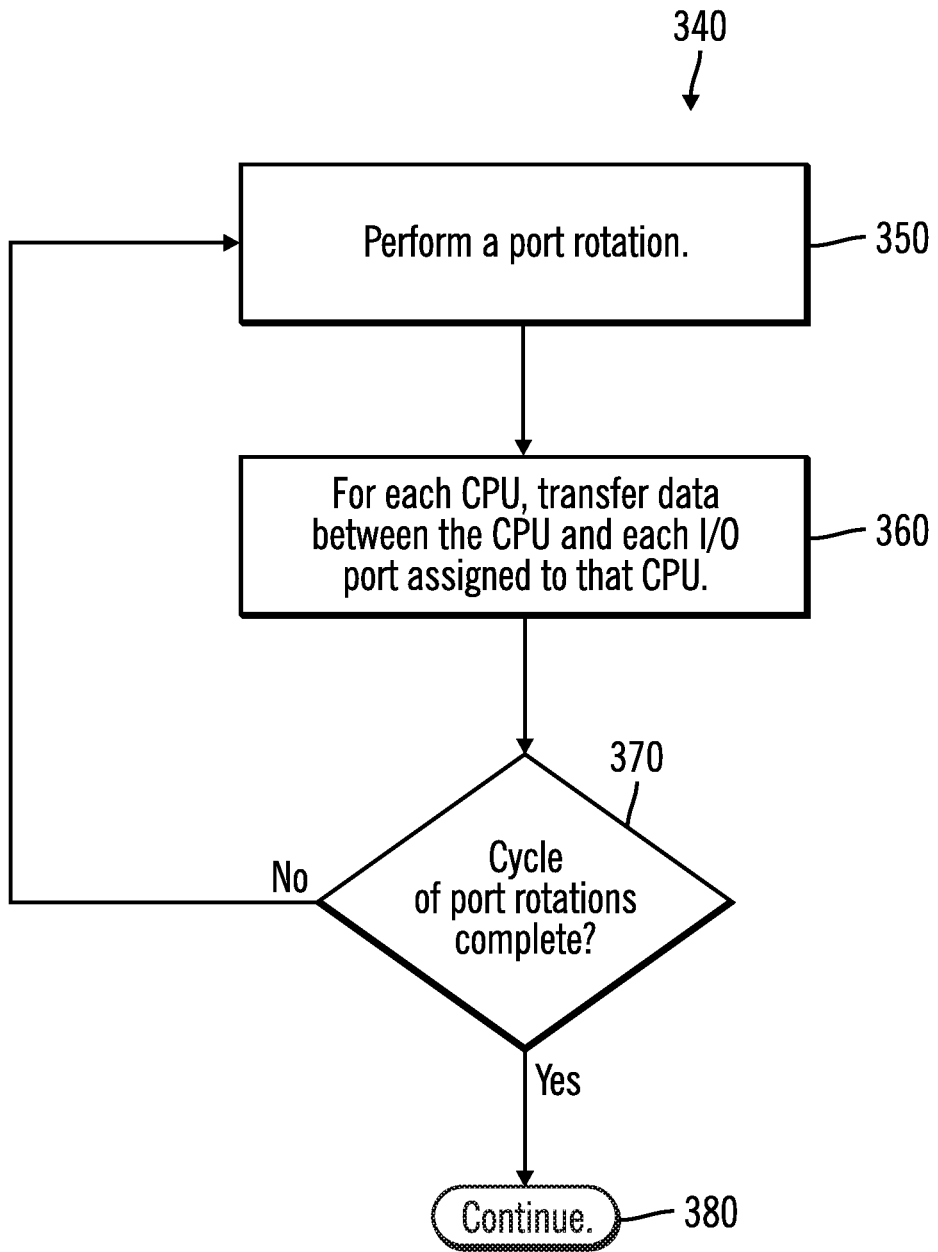

FIG. 4a shows a more detailed example of operations 340 for performing a cycle of port rotations once a cycle of port rotations has been initiated (block 330, FIG. 4). In a first operation of the cycle, a port rotation is performed (block 350). FIG. 5 depicts an example of I/O ports being assigned and then reassigned to a plurality of CPUs in a sequence of port rotations PR0, PR1, PR2 . . . PRn. In this example, the I/O adapter has four CPUs designated CPU0, CPU1, CPU2 and CPU3. In addition, the I/O adapter has eight I/O ports P0-P7, in which in this example, I/O ports P0-P4 are actively running I/O tasks and ports P5-P7 are idle.

In the assignments resulting from port rotation PR0 of FIG. 5, I/O port P0 is assigned to CPU0, I/O port P1 is assigned to CPU1, I/O ports P2, P3 are assigned to CPU2, and I/O port P4 is assigned to CPU3. Following each assignment (or reassignment described below), the CPUs conduct I/O operations (block 360, FIG. 4a) through their assigned I/O ports. Thus, the assignments of port rotation PR0, CPU0 transfers data through its assigned port P0, CPU1 transfers data through its assigned port P1, CPU2 transfers data through its assigned ports P2, P3, and CPU3 transfers data through its assigned port P4.

A determination (block 370, FIG. 4a) is made as to whether the cycle of I/O port rotations has been completed. If so, the port rotations may be terminated (block 380) until another cycle is initiated. If not, another rotation of I/O ports may be performed (block 350, FIG. 4a) among CPUs of the I/O adapter. In the example of FIG. 5 the next port rotation after port rotation PR0 is designated port rotation PR1. Thus, in the course of port rotation PR1, the assignment of I/O port P2 is rotated to a different CPU which is CPU3 in this example.

To effect this change of ownership, the CPU2 performing the transfer can update the list of ports owned in element 250 (FIG. 3b) of the CPU shared data structure 224 for the CPU2 to indicate that I/O port P2 is no longer owned by CPU2. In addition, the CPU2 can change the CPU owner ID stored in element 242 (FIG. 3c) of the I/O port data structure 230 assigned to I/O port P2 from CPU2 to CPU3 and set the lock 260 to inhibit access to I/O port P2 by CPUs other than CPU3. In addition, the CPU2 can update the list of ports owned in element 250 (FIG. 3b) of the CPU shared data structure 224 for the CPU3 to indicate that I/O port P2 is now owned by CPU3.

In the course of rotating the assignment of I/O port P2 from CPU2 to CPU3, the I/O data transfer operations of I/O port P2 will switch from being under the control of CPU2 to being under the control of the CPU3. Thus, once the assignment of I/O port P2 is rotated by CPU2 to CPU3 as described above, any of the I/O data transfer tasks of I/O port P2 initiated or otherwise performed by CPU2 continue but under the control of CPU3 instead of CPU2. CPU3 will continue to carry out those tasks for I/O port P2 so long as CPU3 owns I/O port P2 or until the tasks are completed under the ownership of CPU3. It is appreciated that in some applications, particular I/O data transfer operations of a task may be interrupted to allow for ownership transfer and then resumed once the ownership transfer of the I/O port has been accomplished.

Thus, following this port rotation PR1, the CPUs conduct I/O operations (block 360, FIG. 4a) through their assigned I/O ports. Thus, CPU0 continues to transfer data through its assigned port P0, CPU1 continues to transfer data through its assigned port P1, CPU2 continues to transfer data through its assigned port P3, and CPU3 continues to transfer data through its assigned port P4 and CPU3 begins to transfer data through its newly assigned I/O port P2.

On the next port rotation (block 370, FIG. 4a), the assignments of one or more I/O ports may again be rotated (block 350, FIG. 4a), from one or more CPUs to one or more different CPUs. In the example of FIG. 5 the next port rotation is designated port rotation PR2. Thus, in the course of port rotation PR2, the assignment of I/O port P4 is rotated to a different CPU which is CPU0 in this example.

In the example of FIG. 5, there are four CPUs and five active I/O ports such that at any one time, one CPU has two I/O ports and the remaining CPUs have one I/O port. The I/O port assignments are rotated in a cycle of port rotations such that, in the illustrated embodiment of FIG. 5, each CPU has a second assigned I/O port for at least a portion of the cycle. Thus, in the illustrated embodiment of FIG. 5, a cycle of port rotations includes four sequential port rotations. It is appreciated that the number of port rotations in a cycle may vary depending upon the number of CPUs, the number of I/O ports, and the manner in which I/O ports are rotated. For example, in some rotation sequences, some CPUs may be selected to have more I/O ports more frequently than other CPUs over the course of a cycle. Other rotation sequences may be selected, depending upon the particular application.

In another aspect of the present description, the cycles of I/O port rotations may be spaced using a timer, for example. In other applications, the elapsed time between cycles may be a function of other events.

In another aspect of the present description, a port may be selected for assignment rotation as a function of how long it has been owned by a particular CPU. Thus, the I/O port that has been owned the longest by CPU2 at the time of port rotation PR1 may be selected for assignment rotation. In the example of FIG. 5, I/O port P2 was owned by CPU2 longer than CPU2 owned I/O port P3. Accordingly, I/O port P2 was reassigned to another CPU in the course of port rotation PR1. However, it is appreciated that other criterion may be used to select a port for assignment rotation to another CPU.

In yet another aspect of the present description, the CPU to which the assignment of an I/O port is rotated, may be selected in a linear sequential fashion. For example, an I/O port being rotated from a CPUn, may be reassigned to the next CPU in sequence, that is CPUn+1, for example. An I/O port being rotated from the highest numbered CPUn, may be reassigned to the first CPU in sequence, that is CPU0 for example. Thus, the rotation sequence based on CPU numbers in this example would be 0, 1, 2, 3, 0, 1, 2, 3, 0, 1, etc. Accordingly, in the example of FIG. 5, an I/O port which was owned by CPU2, is reassigned to CPU3, the next CPU in sequence by CPU number. Similarly, an I/O port which was owned by CPU3, is reassigned to CPU0, the next CPU in sequence by CPU number. It is appreciated that other sequences may be used and other criteria may be used to select the destination CPU of an I/O port reassignment.

In the illustrated embodiment of FIG. 5, the port rotations PR0, PR1, PR2 . . . PRn, are each initiated by the expiration of a timer such that initiations of each of the port rotations may be relatively evenly spaced in time. However, it is appreciated that in other applications, the duration of time between adjacent port rotations may vary, depending upon circumstances or the criteria used to determine when to initiate a port rotation or a port rotation cycle.

As previously mentioned, a port may be selected for assignment rotation as a function of how long it has been owned by a particular CPU. Thus, the I/O port that has been owned the longest by CPU3 following port rotation PR1 may be selected for assignment rotation in the next port rotation PR2. In the example of FIG. 5, I/O port P4 was owned by CPU3 longer than CPU3 owned I/O port P2 since I/O port P2 was just reassigned to CPU3 in the prior port rotation (PR1). Accordingly, I/O port P4 is reassigned by port rotation PR2 to the next CPU in sequence, that is CPU0, the next CPU in sequence by CPU number.

Following this port rotation PR2, the CPUs conduct I/O operations (block 360, FIG. 4a) through their assigned I/O ports. Thus, CPU0 transfers data through its assigned ports P0, P4, CPU1 transfers data through its assigned port P1, CPU2 transfers data through its assigned port P3, and CPU3 transfers data through its assigned port P2. Port rotations PR3-PR5 operate in a similar fashion.

Figure 6:
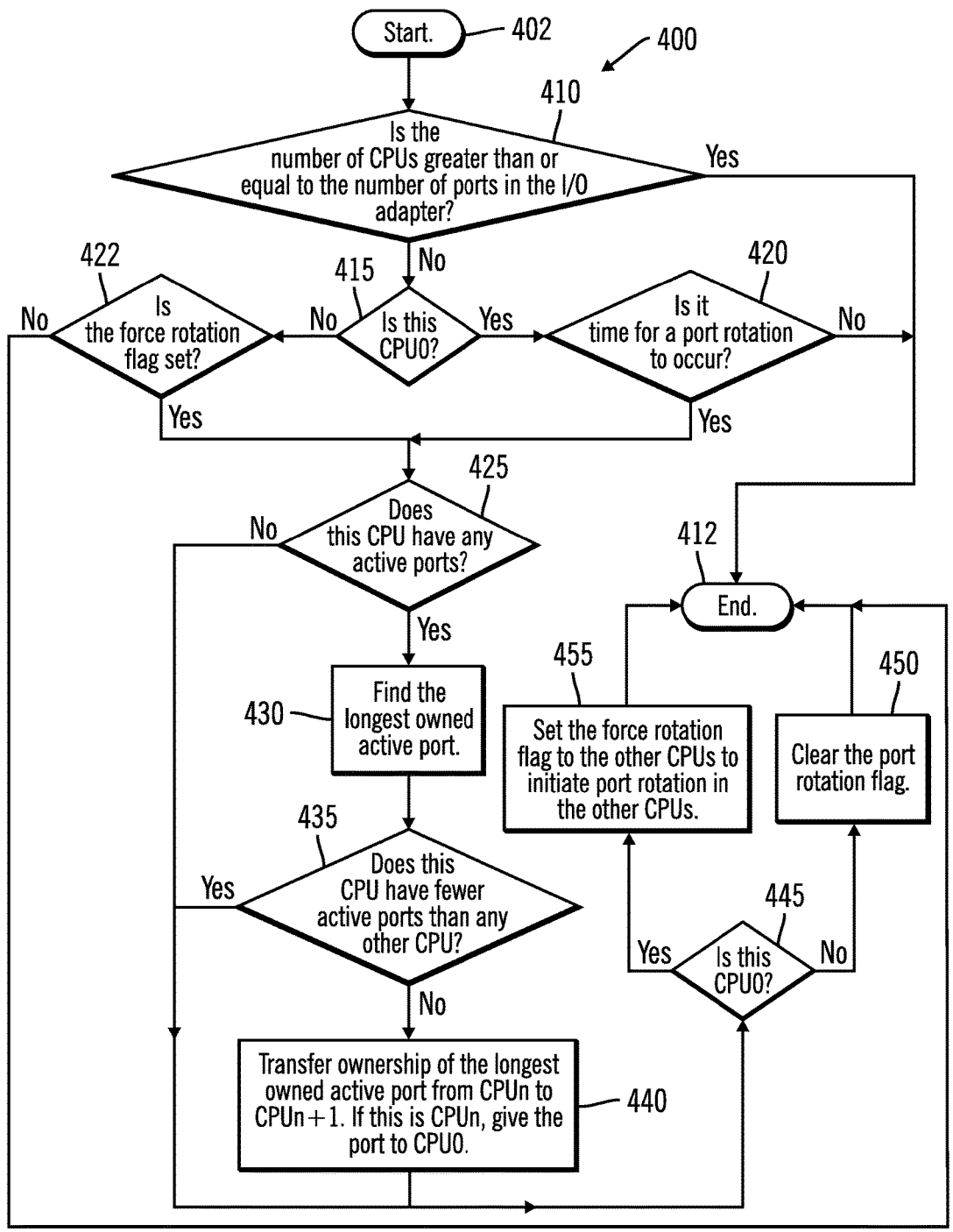
FIG. 6 depicts another example of operations to perform I/O port assignment rotations in accordance with one aspect of the present description.

In the illustrated embodiment, each of the CPUs, CPU0, CPU1, CPU2 and CPU3, performs a scan loop in which the CPU scans various items for tasks to perform. Once the scan loop is completed, the CPU returns to the top of the loop and repeats. FIG. 6 shows a task 400 of a scan loop which provides a more detailed example of operations for rotating I/O port assignments in accordance with one aspect of the present description.

In one operation, upon entering the task 400 (block 402) the CPU executing the task 400 of FIG. 6 determines (block 410) whether the number of CPUs in the I/O adapter is greater than or equal to the number of I/O ports in the I/O adapter. The number of CPUs and I/O ports in the adapter may be determined by examining the CPU shared data structure 224 and I/O port data structure 230 of the CPUs and I/O ports, respectively, for example. In accordance with one aspect of the present description, it is recognized that in some applications, I/O port rotation may be bypassed (block 412) if the number of CPUs is greater than or equal to the number of I/O ports in the adapter. In such situations, each CPU will only own at most one port in the adapter. However, it is appreciated that in other applications, I/O port rotation may be beneficial even in instances where the number of CPUs is greater than or equal to the number of ports in the adapter.

If the number of CPUs of the adapter is less than the number of I/O ports, a determination (block 415) is made as to whether the CPU executing the task 400 is CPU0. In the illustrated embodiment, one CPU, such as CPU0 is selected to determine (block 420) whether to initiate I/O port rotations. If so, as explained in greater detail below, the CPU0 sets a flag for each of the other CPUs, CPU1, CPU2, CPU3, to initiate an I/O port rotation for the other CPUs if appropriate. It is appreciated that, in other applications, any or all of the CPUs may be selected to determine whether port rotation is to occur and if so to initiate I/O port rotation for the other CPUs.

As previously mentioned, a cycle of rotations of I/O port assignments may occur in a sequence of events or cycles. In the illustrated embodiment, the initiation of cycles may be evenly spaced using a timer, for example. In other applications, the elapsed time between cycle initiations may vary. For example, each time a CPU completes a scan loop, a counter may be incremented. Once the counter reaches a predetermined threshold, it may be determined to be an appropriate time to initiate a cycle of I/O port rotations or to initiate a port rotation within a cycle of port rotations. Frequently the time to execute a scan loop may depend upon the number and complexity of the tasks to be completed in a particular scan loop. Hence, the duration of time between port rotations or cycles of I/O port assignment rotations may vary from cycle to cycle or port rotation to port rotation. Other techniques may be used to identify an appropriate time to execute a port rotation or a cycle of I/O port rotations, depending upon the particular application. Should CPU0 determine (block 420) that it is not an appropriate time to initiate I/O port assignment rotations, the port rotation may be bypassed (block 412).

If a determination (block 415) is made that the CPU executing the task 400 is a CPU other than CPU0, a flag (e.g. Force Rotation Flag stored in element 226, FIG. 3b) is examined (block 422) to determine if an I/O port rotation should be executed by that CPU. As previously mentioned, the I/O port rotation flag is set by CPU0 in each of the CPU shared data structure 224 assigned to each of the remaining CPUs, CPU1, CPU2, and CPU3. Should it be determined (block 422) by a CPU other than CPU0 that the Force Rotation Flag has not been set, the port rotation may be bypassed (block 412).

Conversely, should it be determined (block 422) by a CPU other than CPU0 that the Force Rotation Flag has been set for that CPU, or should CPU0 determine (block 420) that it is an appropriate time for an I/O port assignment rotation, a determination (block 425) may be made as to whether the particular CPU executing the task 400 has any active ports. Lacking any active ports, the CPU executing the task 400 may bypass I/O port selection and rotation (blocks 430-440).

If the particular CPU executing the task 400 does have active ports (block 425), the CPU executing the task 400 may determine (block 430) which of the I/O ports owned by that CPU has been owned the longest. In addition, the CPU executing the task 400 determines (block 435) if the particular CPU has fewer active I/O ports than any other CPU, and if so, the CPU executing the task 400 may bypass port rotation (block 440). The number of I/O ports owned by the other CPUs may be determined by examining the CPU shared data structure structures 224 (FIG. 3b) for the other CPUs, for example.

Thus, in the example of FIG. 5, as a result of port rotation PR0, it is indicated that CPU0, CPU1 and CPU3 each has fewer active I/O ports than does CPU2 which has two active I/O ports, P2, P3 as a result of port rotation turn PR0. Hence during the course of the next port rotation PR1, I/O port rotation (block 440, FIG. 6) will be bypassed for CPU0, CPU1 and CPU3 as those CPUs execute task 400 following port rotation PR0. However, CPU0 executing the task 400 will set (block 455) the force rotation flag to the other CPUs to initiate port rotation for the other CPUs since it was previously determined (block 420) that it was time for a port rotation to occur. Also, CPU1 and CPU3 executing the task 400 will each clear (block 450) that flag set for each since it was previously determined that I/O port rotation would be bypassed for CPU1 and CPU3. This completes (block 412) the task 400 for CPU0, CPU1, and CPU3 over the course of port rotation PR1.

Conversely, the CPU2 executing the task 400 at the beginning of port rotation PR1, the next port rotation following port rotation PR0, determines (block 435) that CPU2 does not have fewer active I/O ports than any other CPU (i.e. CPU2 has the same or more I/O ports that any other CPU as a result of port rotation turn PR0). Hence, CPU2 will proceed to transfer ownership (block 440) of the longest owned active I/O port (i.e. I/O port P2) from CPUn (i.e. CPU2) to CPUn+1 (i.e., CPU3) during the course of port rotation turn PR1 as shown in FIG. 5. In addition, since CPU2 is not (block 445) CPU0, and since CPU2 has completed its I/O port transfer, CPU2 will clear (block 450) the Force Rotation Flag stored in element 226 (FIG. 3b) of the CPU shared data structure 224 assigned to CPU2, completing (block 412) the task 400 for CPU2. Thus, the force rotation flag is set by the CPU0 for the other CPUs and cleared by the other CPUs with every port rotation PR0, PR1 . . . PRn.

Similarly, the CPU3 executing the task 400 following the port rotation PR1 determines (block 422) that the force rotation flag has been set (by CPU0) for CPU3, and determines (block 435) that CPU3 does not have fewer active I/O ports than any other CPU (i.e. CPU3 has the same or more I/O ports that any other CPU following port rotation PR1. Hence, CPU3 will proceed to transfer ownership (block 440) of the longest owned active I/O port (i.e. I/O port P4) from CPUn (i.e. CPU3) to CPU0 during the course of port rotation turn PR2 as shown in FIG. 5. In addition, since CPU3 is not (block 445) CPU0, CPU3 will clear (block 450) the Force Rotation Flag stored in element 226 (FIG. 3b) of the CPU shared data structure 224 assigned to CPU3, completing (block 412) the task 400 for CPU3.

CPU0 executing the task 400 following port rotation PR2 determines (block 435) that CPU0 does not have fewer active I/O ports than any other CPU (i.e. CPU0 has the same or more I/O ports that any other CPU following port rotation PR2). Hence, CPU0 will proceed to transfer ownership (block 440) of the longest owned active I/O port (i.e. I/O port P0) from CPUn (i.e. CPU0) to CPUn+1 (i.e., CPU1) during the course of port rotation PR3 as shown in FIG. 5. In addition, since CPU0 is (block 445) CPU0, CPU0 will set (block 455) the Force Rotation Flag stored in element 226 (FIG. 3b) of the CPU shared data structure 224 assigned to each of the other CPUs, CPU1, CPU2, and CPU3, to initiate port rotations for each of the other CPUs if appropriate as discussed above, completing (block 412) the task for 400 for CPU0.

Thus, in the next port rotation PR4, following port rotation PR3, CPU1 will respond (block 422) to the Force Rotation Flag previously set by CPU0 in port rotation turn PR4, and transfer (block 440) its longest owned I/O port (i.e. port P1) to the next CPU (i.e., CPU2), and then clear (block 450) its Force Rotation Flag. In the next port rotation, i.e. port rotation turn PR5, CPU2 will respond (block 422) to the Force Rotation Flag previously set by CPU0 in port rotation turn PR5, and transfer (block 440) its longest owned I/O port (i.e. port P3) to the next CPU (i.e., CPU3), and then clear (block 450) its Force Rotation Flag.

Operations will continue in this manner, one CPU such as CPU0 setting Force Rotation Flags for each of the other CPUs which in the same or succeeding port rotations of the cycle, will rotate zero, one or more I/O ports as appropriate until each CPU has rotated at least one I/O port over the course of the cycle. The CPU0 will then, after expiration of the timer, again set the Force Rotation Flags to initiate another port rotation of another cycle of port rotations for each of the other CPUs.

As can be seen in the example rotations above, every port will eventually be assigned to each CPU of the I/O adapter. Thus, in the embodiment of FIG. 5, the five active I/O ports are sequentially rotated in the sequence P2, P4, P0, P1, P3 over the course of five port rotations PR1, PR2, PR3, PR4, PR5, respectively. The five active I/O ports are then sequentially rotated again in the sequence P2, P4, P0, P1, P3 over the course of next five port rotations. It is believed that such an arrangement can reduce a penalty of an active port sharing a CPU with another active port, by rotating the ports among the CPUs. It is further believed that when the workloads assigned the I/O ports last long enough, the amount of work performed for all ports in the I/O adapter can be more even for all ports. Thus, in a Fibre Channel adapter in a storage controller, for example, it is believed that rotating the ports once per second, for example, is sufficient to improve the balance of the work performed for all active ports when measured once per minute. It is appreciated that other durations may be selected to initiate a cycle of port rotations, depending upon the particular application.

FIG. 7 depicts another example of I/O ports being assigned and then reassigned to a plurality of CPUs in a sequence of port rotations PR10, PR11, PR12 . . . PRn. In this example, the I/O adapter again has four CPUs designated CPU0, CPU1, CPU2 and CPU3. In addition, the I/O adapter has eight I/O ports P0-P7, in which all of the I/O ports P0-P7 are actively running I/O tasks such that no ports are idle. The I/O ports P0-P7 are evenly distributed such that each CPU has two active ports.

In accordance with the present description, it is believed that I/O port rotation may be beneficial in such instances in which the number of active I/O ports is evenly distributable among all of the CPUs, and each CPU owns more than one port, since it is still possible that the work performed for each port may be skewed. For example, ports owned by one CPU may be performing just enough work to be considered active, while the ports owned by another CPU may be heavily stressed.

In such situations, it is recognized that a more balanced distribution of I/O ports may include one light port and one heavy port for each CPU. Such a distribution may be obtained by rotating the busy ports, even when the number of active ports owned by each CPU is equal. However, in some applications, it may not be known by each CPU how busy its own ports are relative to the other ports in the adapter. However, it is believed that port rotations in accordance with the present description may nonetheless improve workload balance even if the degree of stress on a port relative to the other ports of the adapter is unknown by the CPU since port rotation may provide a more balanced workload distribution at least a portion of the time the workload is being performed.

Referring again to FIG. 6, a CPU executing the task 400 of FIG. 6 with the I/O port distribution of FIG. 7, determines (block 410) whether the number of CPUs in the I/O adapter is greater than or equal to the number of I/O ports in the I/O adapter. As set forth above, in the I/O port distribution of FIG. 7, there are eight active I/O ports distributed among four CPUs. Accordingly, I/O port rotation will not be bypassed as a result of the test of operation 410.

Since the number of CPUs of the adapter is less than the number of active I/O ports, a determination (block 415) is made as to whether the CPU executing the task 400 is CPU0. As previously mentioned, in the illustrated embodiment, the CPU0 is selected to determine (block 420) whether to initiate I/O port rotations. In addition, as explained in greater detail below, the CPU0 sets a flag for each of the other CPUs, CPU1, CPU2, CPU3, to initiate an I/O port rotation for those other CPUs if appropriate.

Again, in the illustrated embodiment each port rotation cycle may be initiated upon expiration of a timer, for example. Should CPU0 determine (block 420) that the timer has not expired, the port rotation may be bypassed (block 412) until the timer expires.

In the embodiment of FIG. 7, each CPU of the adapter has two active I/O ports. Hence, in the embodiment of FIG. 7, no CPU will bypass I/O port rotation on account of not having any active ports (block 425). Moreover, in the embodiment of FIG. 7, all CPUs have the same number of I/O ports, that is, two I/O ports. Hence, in the embodiment of FIG. 7, no CPU will bypass I/O port rotation on account of not having an insufficient number of active ports (block 435). As a consequence, in the embodiment of FIG. 7, port rotation will occur for all CPUs of the I/O adapter each time the force rotation flag is determined (block 422) to be set. As a result, in the embodiment of FIG. 7, each cycle of port rotations has a single port rotation such as port rotation PR11, for example, such that each and every CPU of the I/O adapter rotates ownership of an I/O adapter to another CPU of the I/O adapter over the course of the single port rotation PR11. Similarly, each and every CPU of the I/O adapter rotates ownership of an I/O adapter to another CPU of the I/O adapter over the course of the single port rotation PR12, and so on.

Thus, for example, following port rotation PR10 and upon the next expiration of the timer, the next port rotation PR11 begins. In the course of the port rotation PR11, the CPU0 rotates (block 440) ownership of its longest owned I/O port, that is port P0 in the example of FIG. 7) to the next CPU in sequence, that is, CPU1. In addition, the CPU0 sets (block 455) the force rotation flag for the other CPUs to initiate port rotation for the other CPUs over the course of port rotation PR11.

As each of the other CPUs determines (block 422) that the force rotation flag has been set for that CPU, each CPU rotates (block 440) ownership of its longest owned I/O port, to the next CPU in sequence. Thus, as shown in FIG. 7, once the cycle of port rotation PR11 is completed, CPU1 will have rotated its I/O port P2 (its longest owned I/O port) to CPU2 (the next in sequence CPU), CPU2 will have rotated its I/O port P4 (its longest owned I/O port) to CPU3 (the next in sequence CPU), and CPU3 will have rotated its I/O port P6 (its longest owned I/O port) to CPU0 (the next in sequence CPU).

Thus, in port rotation PR11, I/O ports P0, P2, P4 and P6 are rotated to the next in sequence CPU. In the next port rotation PR12, I/O ports P1, P3, P5, and P7 are rotated to the next in sequence CPU. In the next port rotation PR13, I/O ports P0, P2, P4 and P6 are again rotated to the next in sequence CPU. In the next port rotation PR14, I/O ports P1, P3, P5, and P7 are again rotated to the next in sequence CPU, and so on.

Accordingly, in each port rotation PR10, PR 11 . . . PRn, the ownership of four of the eight active I/O ports will be rotated to the next CPU in sequence. In the next succeeding port rotation, the remaining four of the eight active I/O ports will be rotated to the next CPU in sequence, and so on. As a consequence, it is believed that workload distribution may be improved. For example, as a result of port rotation PR10, CPU0 owns I/O ports P0, P1, as a result of port rotation PR11, CPU0 owns I/O ports P1, P6, as a result of port rotation PR12, CPU0 owns I/O ports P6, P7, and so on. Thus, the mix of I/O ports owned by a particular CPU changes each port rotation cycle, which in this embodiment, includes a single port rotation.

It is believed that such an arrangement can reduce a penalty of a very active port sharing a CPU with another very active port, by rotating the ports among the CPUs. It is further believed that when the workloads assigned the I/O ports last long enough, the amount of work performed for all ports in the I/O adapter can be more even for all ports. Thus, in a Fibre Channel adapter in a storage controller, for example, it is believed that rotating the ports once per second is sufficient to improve the balance of the work performed for all active ports when measured once per minute. It is appreciated that other durations may be selected to initiate a cycle of port rotations, depending upon the particular application.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 2 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 1 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-7 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    assigning input/output (I/O) ports to a plurality of central processing units (CPUs) of an I/O adapter to provide a current distribution of I/O ports to CPUs;
    for each CPU, transferring data between the CPU and each I/O port assigned to that CPU;
    determining as a function of the current distribution of I/O ports to CPUs, whether to selectively initiate a cycle of I/O port rotations including determining whether to bypass I/O port rotation; and
    upon determining to selectively initiate the cycle of I/O port rotations, selectively initiating the cycle of port rotations in which each port rotation of the cycle includes rotating an assignment of at least one I/O port from one CPU to a different CPU of the plurality of CPUs to provide a different distribution of I/O ports to CPUs and wherein an I/O port assignment for each CPU of the plurality CPUs is rotated for at least a portion of the cycle.

2. The method of claim 1 wherein the data transferring includes initiating a task of transfer of data at said at least one I/O port under control of said one CPU and continuing the task of transfer of data at said at least one I/O port under control of said different CPU following the rotation of assignment of said at least one I/O port from said one CPU to said different CPU.

3. The method of claim 1 wherein said determining whether to selectively initiate the cycle of I/O port rotations including determining whether to bypass the cycle of I/O port rotations, includes determining whether the number of CPUs of the plurality of CPUs is one of greater than and equal to the number of I/O ports of the I/O adapter.

4. The method of claim 1 wherein said determining whether to selectively initiate the cycle of I/O port rotations, includes determining whether a predetermined time period has expired.

5. The method of claim 1 wherein the selectively initiating the cycle of I/O port rotations includes setting by one CPU, a rotation flag for the remaining CPUs of the plurality of CPUs, to initiate port rotations for the remaining CPUs of the plurality of CPUs.

6. The method of claim 1 wherein each port rotation of said cycle of I/O port rotations includes determining for each CPU, whether to rotate a port assignment of the particular CPU to a different CPU of the plurality of CPUs.

7. The method of claim 6 wherein the selectively initiating the cycle of I/O port rotations includes setting by one CPU, a rotation flag for the remaining CPUs of the plurality of CPUs, to initiate port rotations for the remaining CPUs of the plurality of CPUs, and wherein the determining for each CPU whether to rotate a port assignment, includes checking whether the rotation flag has been set for that particular CPU.

8. The method of claim 6 wherein the determining for each CPU whether to rotate a port assignment, includes determining whether that particular CPU has any active I/O ports, and if so, whether that CPU has fewer active I/O ports than any other CPU of the plurality of CPUs.

9. The method of claim 1 wherein each port rotation of said cycle of I/O port rotations includes determining for each CPU, whether to rotate a port assignment of the particular CPU to a different CPU of the plurality of CPUs, and if so, selecting the active I/O port which has been owned the longest by the particular CPU.

10. The method of claim 1 wherein the CPUs of the plurality of CPUs are sequentially numbered in a sequence and wherein the rotating an assignment of at least one I/O port from one CPU to a different CPU of the plurality of CPUs includes rotating an assignment of at least one I/O port from one CPU to the next sequentially numbered CPU in the sequence of the sequentially numbered CPUs.

11. A computer program product for use with an I/O adapter having a plurality of central processing units (CPUs) and a plurality of input/output (I/O) ports coupled to at least one of hosts and storage in a storage area network (SAN), the computer program product comprising a computer readable storage device having computer readable program code embodied therein that executes to perform operations, the operations comprising:
    assigning input/output (I/O) ports to a plurality of central processing units (CPUs) of an I/O adapter to provide a current distribution of I/O ports to CPUs;
    for each CPU, transferring data between the CPU and each I/O port assigned to that CPU;
    determining as a function of the current distribution of I/O ports to CPUs, whether to selectively initiate a cycle of I/O port rotations including determining whether to bypass I/O port rotation; and
    upon determining to selectively initiate the cycle of I/O port rotations, selectively initiating the cycle of port rotations in which each port rotation of the cycle includes rotating an assignment of at least one I/O port from one CPU to a different CPU of the plurality of CPUs to provide a different distribution of I/O ports to CPUs and wherein an I/O port assignment for each CPU of the plurality CPUs is rotated for at least a portion of the cycle.

12. The computer program product of claim 11 wherein the data transferring includes initiating a task of transfer of data at said at least one I/O port under control of said one CPU and continuing the task of transfer of data at said at least one I/O port under control of said different CPU following the rotation of assignment of said at least one I/O port from said one CPU to said different CPU.

13. The computer program product of claim 11 wherein said determining whether to selectively initiate the cycle of I/O port rotations including determining whether to bypass the cycle of I/O port rotations, includes determining whether the number of CPUs of the plurality of CPUs is one of greater than and equal to the number of I/O ports of the I/O adapter.

14. The computer program product of claim 11 wherein said determining whether to selectively initiate the cycle of I/O port rotations, includes determining whether a predetermined time period has expired.

15. The computer program product of claim 11 wherein the selectively initiating the cycle of I/O port rotations includes setting by one CPU, a rotation flag for the remaining CPUs of the plurality of CPUs, to initiate port rotations for the remaining CPUs of the plurality of CPUs.

16. The computer program product of claim 11 wherein each port rotation of said cycle of I/O port rotations includes determining for each CPU, whether to rotate a port assignment of the particular CPU to a different CPU of the plurality of CPUs.

17. The computer program product of claim 16 wherein the selectively initiating the cycle of I/O port rotations includes setting by one CPU, a rotation flag for the remaining CPUs of the plurality of CPUs, to initiate port rotations for the remaining CPUs of the plurality of CPUs, and wherein the determining for each CPU whether to rotate a port assignment, includes checking whether the rotation flag has been set for that particular CPU.

18. The computer program product of claim 16 wherein the determining for each CPU whether to rotate a port assignment, includes determining whether that particular CPU has any active I/O ports, and if so, whether that CPU has fewer active I/O ports than any other CPU of the plurality of CPUs.

19. The computer program product of claim 11 wherein each port rotation of said cycle of I/O port rotations includes determining for each CPU, whether to rotate a port assignment of the particular CPU to a different CPU of the plurality of CPUs, and if so, selecting the active I/O port which has been owned the longest by the particular CPU.

20. The computer program product of claim 11 wherein the CPUs of the plurality of CPUs are sequentially numbered in a sequence and wherein the rotating an assignment of at least one I/O port from one CPU to a different CPU of the plurality of CPUs includes rotating an assignment of at least one I/O port from one CPU to the next sequentially numbered CPU in the sequence of the sequentially numbered CPUs.

21. A system for use with a host, storage and a storage area network (SAN), comprising:
an I/O adapter having a plurality of processors including a plurality of central processing units (CPUs), a plurality of input/output (I/O) ports coupled to at least one of hosts and storage in a storage area network (SAN), and a computer readable storage medium including code executed by a processor to perform operations, the operations comprising:
assigning input/output (I/O) ports to a plurality of central processing units (CPUs) of the I/O adapter to provide a current distribution of I/O ports to CPUs;
for each CPU, transferring data between the CPU and each I/O port assigned to that CPU;
determining whether to selectively initiate a cycle of I/O port rotations including determining whether to bypass I/O port rotation; and
upon determining to selectively initiate the cycle of I/O port rotations, selectively initiating the cycle of port rotations in which each port rotation of the cycle includes rotating an assignment of at least one I/O port from one CPU to a different CPU of the plurality of CPUs to provide a different distribution of I/O ports to CPUs and wherein an I/O port assignment for each CPU of the plurality CPUs is rotated for at least a portion of the cycle.

22. The system of claim 21 wherein the data transferring includes initiating a task of transfer of data at said at least one I/O port under control of said one CPU and continuing the task of transfer of data at said at least one I/O port under control of said different CPU following the rotation of assignment of said at least one I/O port from said one CPU to said different CPU.

23. The system of claim 21 wherein said determining whether to selectively initiate the cycle of I/O port rotations including determining whether to bypass the cycle of I/O port rotations, includes determining whether the number of CPUs of the plurality of CPUs is one of greater than and equal to the number of I/O ports of the I/O adapter.

24. The system of claim 21 wherein said determining whether to selectively initiate the cycle of I/O port rotations, includes determining whether a predetermined time period has expired.

25. The system of claim 21 wherein the selectively initiating the cycle of I/O port rotations includes setting by one CPU, a rotation flag for the remaining CPUs of the plurality of CPUs, to initiate port rotations for the remaining CPUs of the plurality of CPUs.

26. The system of claim 21 wherein each port rotation of said cycle of I/O port rotations includes determining for each CPU, whether to rotate a port assignment of the particular CPU to a different CPU of the plurality of CPUs.

27. The system of claim 26 wherein the selectively initiating the cycle of I/O port rotations includes setting by one CPU, a rotation flag for the remaining CPUs of the plurality of CPUs, to initiate port rotations for the remaining CPUs of the plurality of CPUs, and wherein the determining for each CPU whether to rotate a port assignment, includes checking whether the rotation flag has been set for that particular CPU.

28. The system of claim 26 wherein the determining for each CPU whether to rotate a port assignment, includes determining whether that particular CPU has any active I/O ports, and if so, whether that CPU has fewer active I/O ports than any other CPU of the plurality of CPUs.

29. The system of claim 21 wherein each port rotation of said cycle of I/O port rotations includes determining for each CPU, whether to rotate a port assignment of the particular CPU to a different CPU of the plurality of CPUs, and if so, selecting the active I/O port which has been owned the longest by the particular CPU.

30. The system of claim 21 wherein the CPUs of the plurality of CPUs are sequentially numbered in a sequence and wherein the rotating an assignment of at least one I/O port from one CPU to a different CPU of the plurality of CPUs includes rotating an assignment of at least one I/O port from one CPU to the next sequentially numbered CPU in the sequence of the sequentially numbered CPUs.

* * * * *